(12) United States Patent
Weissmann et al.

(10) Patent No.: US 9,760,158 B2
(45) Date of Patent: Sep. 12, 2017

(54) FORCING A PROCESSOR INTO A LOW POWER STATE

(71) Applicant: Intel Corporation, Santa Clara, CA (US)

(72) Inventors: Eliezer Weissmann, Haifa (IL); Yoni Aizik, Haifa (IL); Doron Rajwan, Rishon le-Zion (IL); Nir Rosenzweig, Givat Ella (IL); Efraim Rotem, Haifa (IL); Barnes Cooper, Tigard, OR (US); Paul S. Diefenbaugh, Portland, OR (US); Guy M. Therien, Beaverton, OR (US); Michael Mishaeli, Zichron Yaakov (IL); Nadav Shulman, Tel Mond (IL); Ido Melamed, Kfar-Saba (IL); Niv Tokman, Haifa (IL); Alexander Gendler, Kiriat Motzkin (IL); Arik Gihon, Rishon le Zion (IL); Yevgeni Sabin, Haifa (IL); Hisham Abu Salah, Majdal Shams (IL); Esfir Natanzon, Haifa (IL)

(73) Assignee: Intel Corporation, Santa Clara, CA (US)

( * ) Notice: Subject to any disclaimer, the term of this patent is extended or adjusted under 35 U.S.C. 154(b) by 401 days.

(21) Appl. No.: 14/298,171

(22) Filed: Jun. 6, 2014

(65) Prior Publication Data

US 2015/0355705 A1 Dec. 10, 2015

(51) Int. Cl.
*G06F 1/00* (2006.01)
*G06F 1/32* (2006.01)
*G06F 11/07* (2006.01)

(52) U.S. Cl.
CPC .......... *G06F 1/3287* (2013.01); *G06F 1/3203* (2013.01); *G06F 1/324* (2013.01); *G06F 11/0757* (2013.01)

(58) Field of Classification Search
CPC ...... G06F 1/3287; G06F 1/324; G06F 1/3203; G06F 11/0757
See application file for complete search history.

(56) References Cited

U.S. PATENT DOCUMENTS 5,163,153 A 11/1992 Cole et al.
5,522,087 A 5/1996 Hsiang
(Continued)

FOREIGN PATENT DOCUMENTS

EP 1 282 030 A1 5/2003
TW 201218072 5/2012

OTHER PUBLICATIONS

United States Patent and Trademark Office, Office Action mailed Mar. 24, 2016 in U.S. Appl. No. 14/298,225.
(Continued)

*Primary Examiner* — Mohammed Rehman
*Assistant Examiner* — Gayathri Sampath
(74) *Attorney, Agent, or Firm* — Trop, Pruner & Hu, P.C.

(57) ABSTRACT

In an embodiment, a processor includes multiple cores and a power controller. The power controller may include a hardware duty cycle (HDC) logic to cause at least one logical processor of one of the cores to enter into a forced idle state even though the logical processor has a workload to execute. In addition, the HDC logic may cause the logical processor to exit the forced idle state prior to an end of an idle period if at least one other logical processor is prevented from entry into the forced idle state. Other embodiments are described and claimed.

22 Claims, 13 Drawing Sheets

(56) References Cited

U.S. PATENT DOCUMENTS

| | | | |
|---|---|---|---|
| 5,590,341 A | 12/1996 | Matter | |
| 5,621,250 A | 4/1997 | Kim | |
| 5,761,524 A | 6/1998 | Peterson et al. | |
| 5,931,950 A | 8/1999 | Hsu | |
| 6,193,422 B1* | 2/2001 | Belt | G06F 1/24 710/18 |
| 6,748,546 B1 | 6/2004 | Mirov et al. | |
| 6,792,392 B1 | 9/2004 | Knight | |
| 6,823,516 B1 | 11/2004 | Cooper | |
| 6,829,713 B2 | 12/2004 | Cooper et al. | |
| 6,996,728 B2 | 2/2006 | Singh | |
| 7,010,708 B2 | 3/2006 | Ma | |
| 7,043,649 B2 | 5/2006 | Terrell | |
| 7,093,147 B2 | 8/2006 | Farkas et al. | |
| 7,111,179 B1 | 9/2006 | Girson et al. | |
| 7,174,469 B2 | 2/2007 | Luick | |
| 7,194,643 B2 | 3/2007 | Gonzalez et al. | |
| 7,272,730 B1 | 9/2007 | Acquaviva et al. | |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,526,661 B2 | 4/2009 | Nakajima et al. | |
| 7,529,956 B2 | 5/2009 | Stufflebeam | |
| 7,539,885 B2 | 5/2009 | Ma | |
| 7,730,340 B2 | 6/2010 | Hu et al. | |
| 8,694,994 B1 | 4/2014 | Vincent et al. | |
| 2001/0005892 A1* | 6/2001 | Watts, Jr. | G06F 1/206 713/300 |
| 2001/0044909 A1 | 11/2001 | Oh et al. | |
| 2002/0194509 A1 | 12/2002 | Plante et al. | |
| 2003/0061383 A1 | 3/2003 | Zilka | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0230850 A1* | 11/2004 | Baumgartner | G06F 1/12 713/320 |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0132238 A1 | 6/2005 | Nanja | |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2006/0288240 A1 | 12/2006 | Kardach et al. | |
| 2007/0005995 A1 | 1/2007 | Kardach et al. | |
| 2007/0016817 A1 | 1/2007 | Albonesi et al. | |
| 2007/0079294 A1 | 4/2007 | Knight | |
| 2007/0106827 A1 | 5/2007 | Boatright et al. | |
| 2007/0156992 A1 | 7/2007 | Jahagirdar | |
| 2007/0214342 A1 | 9/2007 | Newburn | |
| 2007/0239398 A1 | 10/2007 | Song et al. | |
| 2007/0245163 A1 | 10/2007 | Lu et al. | |
| 2008/0028240 A1 | 1/2008 | Arai et al. | |
| 2008/0250260 A1 | 10/2008 | Tomita | |
| 2009/0006871 A1 | 1/2009 | Liu et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0177422 A1* | 7/2009 | Cox | G06F 1/3203 702/64 |
| 2009/0235105 A1 | 9/2009 | Branover et al. | |
| 2010/0077243 A1* | 3/2010 | Wang | G06F 1/3209 713/323 |
| 2010/0115309 A1 | 5/2010 | Carvalho et al. | |
| 2010/0146513 A1 | 6/2010 | Song | |
| 2010/0156888 A1 | 6/2010 | Luk et al. | |
| 2010/0191997 A1 | 7/2010 | Dodeja et al. | |
| 2011/0154090 A1 | 6/2011 | Dixon et al. | |
| 2012/0079290 A1 | 3/2012 | Kumar | |
| 2012/0246506 A1 | 9/2012 | Knight | |
| 2012/0284729 A1* | 11/2012 | Sharda | G06F 9/5094 718/104 |
| 2013/0007494 A1 | 1/2013 | Branover et al. | |
| 2013/0061064 A1 | 3/2013 | Ananthakrishnan et al. | |
| 2013/0080803 A1 | 3/2013 | Ananthakrishnan et al. | |
| 2013/0080804 A1 | 3/2013 | Ananthakrishan et al. | |
| 2013/0111120 A1 | 5/2013 | Ananthakrishnan et al. | |
| 2013/0111121 A1 | 5/2013 | Ananthakrishnan et al. | |
| 2013/0111226 A1 | 5/2013 | Ananthakrishnan et al. | |
| 2013/0111236 A1 | 5/2013 | Ananthakrishnan et al. | |
| 2014/0068290 A1 | 3/2014 | Bhandaru et al. | |
| 2014/0181554 A1* | 6/2014 | Manne | G06F 1/3234 713/323 |
| 2014/0276710 A1 | 9/2014 | Wittenberger et al. | |
| 2015/0153393 A1 | 6/2015 | Jeon | |

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

SPEC-Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays In A GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling For Real-Time Embedded Systems," 2004, pp. 275-280.

Ravindra Jejurikar, et al., "Dynamic Slack Reclamation With Procrastination Scheduling In Real-Time Embedded Systems," 2005, pp. 13-17.

R. Todling, et al., "Some Strategies For Kalman Filtering and Smoothing," 1996, pp. 1-21.

R.E. Kalman, "A New Approach to Linear Filtering and Prediction Problems," 1960, pp. 1-12.

International Application No. PCT/US2012/028865, filed Mar. 13, 2012, entitled "Providing Efficient Turbo Operation Of A Processor," by Intel Corporation.

International Application No. PCT/US2012/028902, filed Mar. 13, 2012, entitled "Dynamically Controlling Interconnect Frequency In A Processor," by Intel Corporation.

International Application No. PCT/US2012/028876, filed Mar. 13, 2012, entitled "Dynamically Computing An Electrical Design Point (EDP) For A Multicore Processor," by Intel Corporation.

U.S. Appl. No. 14/109,388, filed Dec. 17, 2013, entitled "Rescheduling Workloads To Enforce And Maintain A Duty Cycle," by Inder M. Sodhi, et al.

Intel Corporation, "Intel 64 and IA-32 Architectures Software Developer's Manual," vol. 3 (3A, 3B & 3C): System Programming Guide, Feb. 2014, Chapter 14 Power and Thermal Management (14.1-14.9.5), 44 pages.

(56) References Cited

OTHER PUBLICATIONS

Taiwan Intellectual Property Office, Office Action mailed Apr. 26, 2016 in Taiwanese Patent Application No. 104113710. (Translation Redacted).

* cited by examiner

FORCING A PROCESSOR INTO A LOW POWER STATE

TECHNICAL FIELD

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

In various embodiments, hardware-controlled duty cycling (HDC) enables a processor to autonomously force some or all components of the processor into an idle state such as a given low power state. For example, it is possible for the processor to selectively force only the cores (or subset of the cores) of the processor (such as so-called Intel Architecture (IA) cores) into an idle state. Or in other cases, additional compute engines such as graphics processing units or other such engines may be forced into a given low power state. In an embodiment, HDC may be controllably enabled or disabled by default on a supported processor. In such cases, system software (e.g., an operating system (OS) or basic input output system (BIOS)) may dynamically enable or disable HDC operation. Note that while in an active HDC mode, the processor does not delay events such as timer expirations or any receiving device interrupt, but it may affect the latency of short software threads when a thread is forced into an idle state just before completion and entry into a natural idle state, as well as adding latency into normal execution due to the forced idle that is not of a normal execution flow.

HDC forced idle operation can be thought of as an operating frequency drop. That is, the effective average operating frequency (e.g., as computed by software) includes the HDC-forced idle impact. Still software assumes to count the HDC operation simply as idle time during its regular execution time.

The main target of HDC is to increase residency in a deep low power state (e.g., a package level low power state) for low active workloads as well as providing a more effective manner of reducing average operating frequency in case of power or thermal limitations for high active workloads. When a logical processor, core or package enters into a forced idle state, it may be placed into a relatively deep low power state, particularly where receiving events are aligned to occur in active windows.

Figure 1:
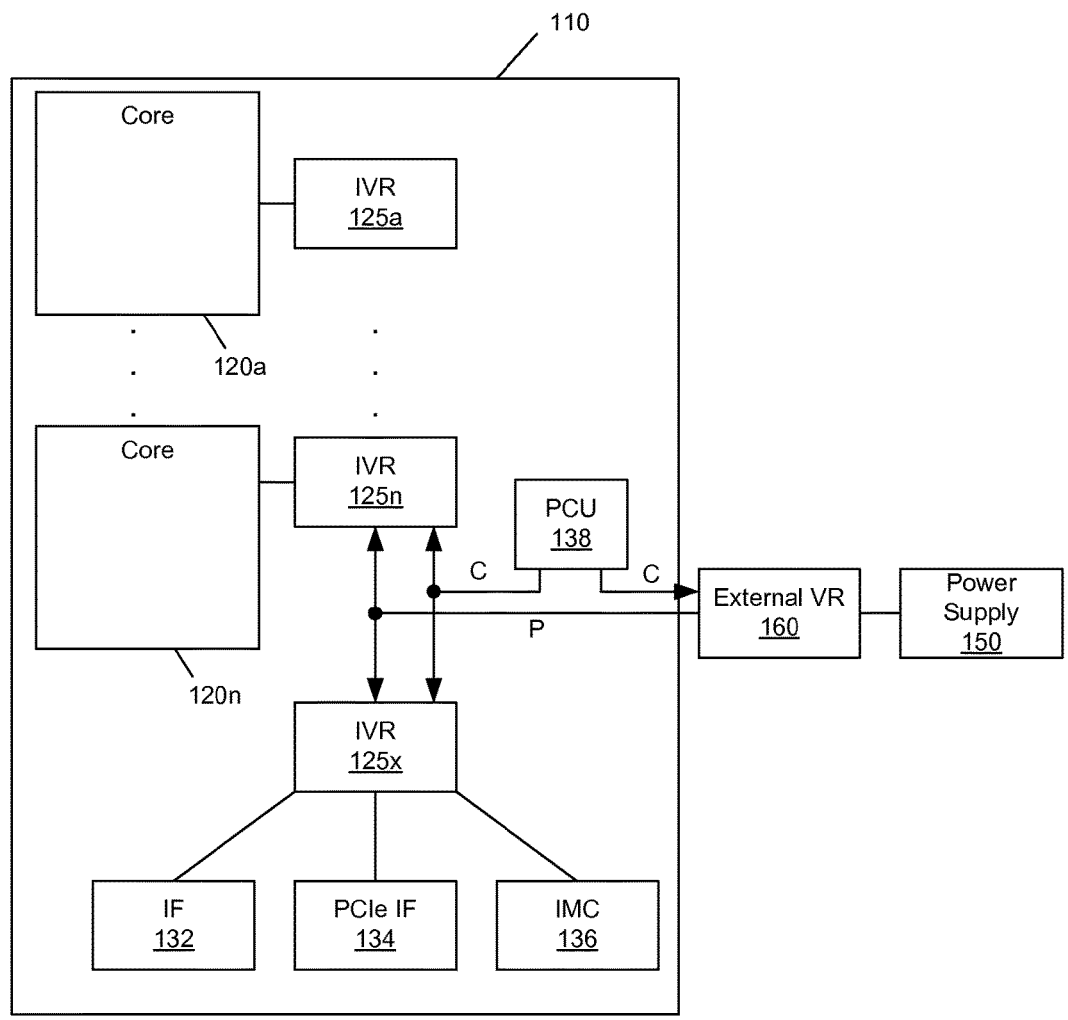
FIG. 1 is a block diagram of a system in accordance with one embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores 120a-120n. In addition, each core may be associated with an integrated voltage regulator (IVR) 125a-125n which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance.

Still referring to FIG. 1, additional components may be present within the processor including an input/output interface 132, another interface 134, and an integrated memory controller 136. As seen, each of these components may be powered by another integrated voltage regulator 125x. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include logic to control and perform HDC operation as described herein.

While not shown for ease of illustration, understand that additional components may be present within processor 110 such as uncore logic, and other components such as graphics processors, internal memories, e.g., one or more levels of a cache memory hierarchy and so forth. Furthermore, while shown in the implementation of FIG. 1 with an integrated voltage regulator, embodiments are not so limited. Furthermore, understand that in some embodiments certain components may share a voltage regulator while other components may have private voltage regulators.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the hardware duty cycle or opportunistic power down (OPD) operation described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth). In a forced idle state, a hardware thread, core and/or processor package may be placed into a selected C-state, e.g., at least a C3 state.

Embodiments provide various interfaces to enable the OS, BIOS or other system software to determine whether HDC is supported on a given processor, control HDC operation and monitor its impact. Control of HDC may be effected in various manners in different embodiments. In one embodiment, HDC may be enabled with full control by the system BIOS, with or without assist from an OS driver that can be developed either by the OS vendor or by any other software vendor. In this mode the OS does not control HDC. In another embodiment, HDC may be enabled with full control by the OS such that the OS can dynamically enable or disable HDC. In an embodiment, system BIOS selects the mode of HDC control operation during boot. In case HDC is controlled by the OS, hardware may enumerate capabilities for HDC operation. The OS in turn may ensure that HDC is supported on the given processor and then enable HDC.

HDC enable/disable is possible either at the processor package level or at the logical processor level. As used herein, the terms "logical processor" and "hardware thread" are interchangeable and used to refer to hardware structures of a processor to provide control of and state for a thread to be executed on other logic or other hardware of a core.

In order for a logical processor to participate in duty cycling, both the package and that logical processor may be enabled for HDC. Enabling or disabling package level HDC can be done by any logical processor. Logical processor level HDC can be enabled or disabled within the context that executes on that logical processor only. In one default case, logical processor HDC is enabled, while package level is disabled, in an embodiment. In this default case, the OS may opt-in to use HDC such that the OS enables the package level HDC in order to enable the HDC operation.

Figure 2:
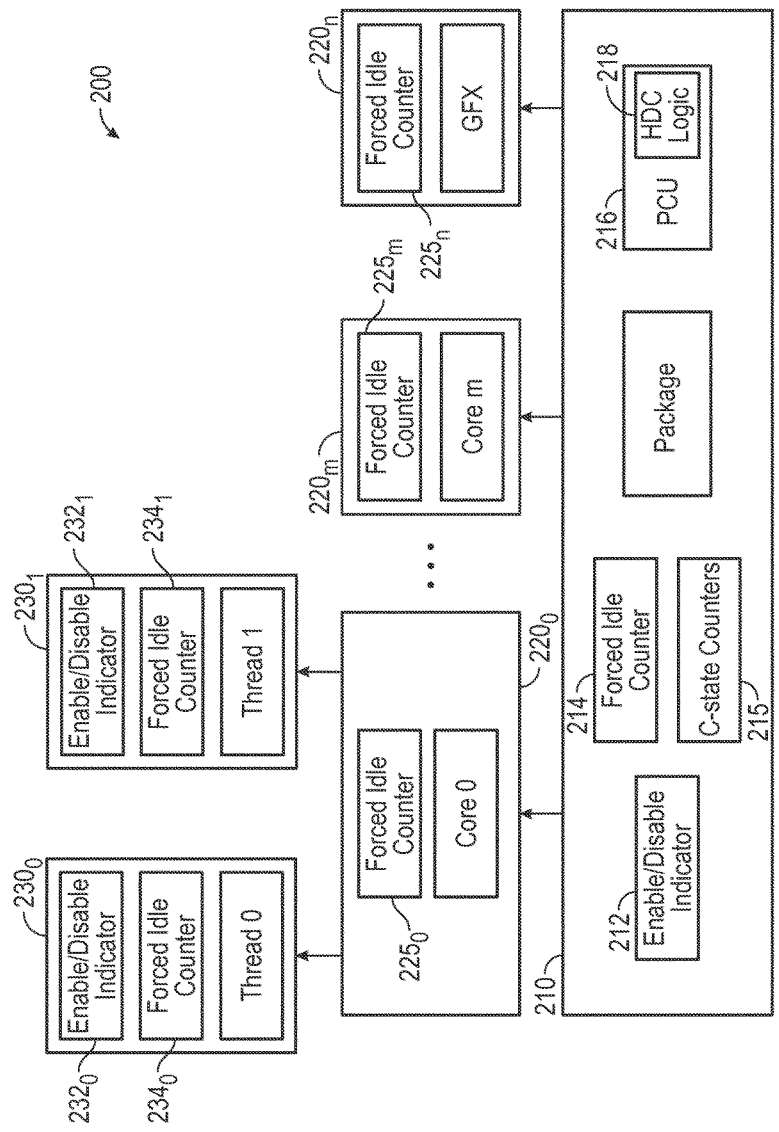
FIG. 2 is a block diagram of a processor in accordance with an embodiment of the present invention.

Referring now to FIG. 2, shown is a block diagram of a processor in accordance with an embodiment of the present invention. As shown in FIG. 2, processor 200 is implemented as a multicore processor, e.g., a single package processor in which multiple cores and other compute engines are implemented on one or more semiconductor die within the package. Note that this logical illustration separates cores from the package, and threads from the cores; however understand that the threads are hardware threads or logical processors of an underlying core and that the cores are themselves part of the package. And of course, HDC support can be provided for a multi-package system also.

In the illustration of FIG. 2, note the presence of a package-level enable/disable indicator 212 that is configured to indicate whether the processor as a whole (e.g., on a package basis) is enabled to be placed into a forced idle state. Also present is a forced idle counter 214 that is configured to count cycles in which the package is in a forced idle state, meaning that at least one hardware thread within the package is undergoing a forced idle state, while all other threads of the package are in an idle state, either natively by OS request or due to a forced idle. In addition, a plurality of low power state counters 215, also referred to herein as C-state counters, are present.

Still referring to FIG. 2, a power control unit (PCU) 216 is present that includes a HDC logic 218, details of which will be described further below. Suffice to say, HDC logic 218 is involved in implementing package-wide decisions to enter into appropriate duty cycle states, including duration of such states, and coordination or synchronization of control of such duty cycle states between various logical processors, cores, computing engines and other such units within package 210.

Still referring to FIG. 2, a plurality of cores $220_0$-$220_m$ is present within package 210. As seen, each core includes its own forced idle counter $225_0$-$225_m$. These forced idle counters may be configured to count idle cycles when one or more logical processors (namely hardware threads) of the corresponding core is in a forced idle state. Also present is a graphics processor $220_n$ that also has its own forced idle counter $225_n$.

As further shown in FIG. 2, one or more cores may include multiple hardware threads including various structures such a state storage for the given thread. In the context of FIG. 2, note that core $220_0$ includes multiple hardware threads $230_0$ and $230_1$, each including their own enable/disable indicator 232 and forced idle counter 234.

In some embodiments, HDC efficiency may be maximized only when a whole package is duty cycled. In such embodiments, disabling HDC for a single logical processor may create an asymmetry where that logical processor is duty cycled and others are not. To this end, embodiments may provide an asynchronous mechanism that communicates to a HDC master (which may be logic within a PCU) that a logical processor is disabled for HDC operation. This prevents most asymmetric situations, as in such cases the HDC master can prevent other logical processors from entering into HDC operation. Understand however that HDC operation may still occur if only part of the cores succeeded to be entered into an idle state. It is also possible in an embodiment to enable HDC operations only while an integrated graphic processor is in an idle state.

Furthermore, the processor (e.g., via the HDC master or other logic) can detect an asymmetric entry to HDC and wake up the duty cycled logical processors. Note that disabling at the logical processor level (and not at the package level) may be preferred to realize operation latency, as package level duty cycling can be more costly. An advanced OS or other low level software can tune HDC to avoid quality of service (QoS) issues by setting a minimum active time or a maximum idle time to be effected during HDC operation. Embodiments may also set an active time percentage (e.g., duty cycle) within the above constraints.

Duty cycling may be equivalent to an effective frequency reduction. Assume that a current duty cycle is X %, then the effective frequency is a processor operating frequency*X. In order for an OS or other software to measure the effective frequency it receives, independent of whether duty cycling took place or not, configuration of performance counters can be controlled. For example in one embodiment, a first performance counter (e.g., a so-called MPERF machine specific register (MSR)) continues counting during HDC forced idle operation and a second performance counter (e.g., an APERF MSR) does not. Then the OS can compute the effective frequency by computing: nominal operating frequency*ΔAPERF/ΔMPERF. Note that certain software may have the option to disable this mode and enable the MPERF counter to stop as well during forced idle states and behave the same as during regular idle states.

In other situations, the MPERF MSR can be configured not to count during forced idle periods, thus providing the true number of clock ticks that the logical processor was in the active or C0 state. In one embodiment, the enable/disable access of MSR is done by BIOS control option to make HDC visible as an architectural feature. The MSRs that are architectural are the thread level counter, the thread level enable/disable and the package level enable/disable, in an embodiment. In an embodiment, a logical processor MSR counts the number of clock tocks that a logical processor was in a forced idle state. A core MSR counts the number of clock ticks that all its logical processors were idle and at least one of them was in a forced idle state, in an embodiment. A package MSR counts the clock ticks in which the whole package was in an idle state and at least one of its logical processors or other compute engines (such as an integrated graphics engine) was in forced idle state, in an embodiment. Any other compute engine present within the package also may have its own forced idle counter. Note that there may be an opt-out control option. In this mode the BIOS has the option to enable the HDC support but without architectural support. Thus the MSRs that count in the previous discussion are not valid and the HDC CPUID also removed. From the OS view, the HDC does not exist, but the OS has the option to tune HDC support via other tune options (maximum idle time, minimum active time, HDC direct control, etc.).

In order to differentiate between the C-state levels the package entered during forced idle periods, a plurality of low power state counters 215 may be provided as shown in FIG. 2, with each counter associated with a given low power state. Software can configure the processor to count forced idle clock ticks that the package was at C-state X or deeper, and the OS or other software can use those counters to compute logical processor and package active duration as part of its scheduling or accounting algorithms. Embodiments thus provide a software interface to control hardware duty cycle operation effected by processor cores and other compute engines.

Note that the processor-initiated forced idle without OS direct control (and which may occur even when the OS explicitly scheduled tasks to execute on the processor cores) is implemented using processor hardware. In part, this hardware performs the following operations in a control flow: periodically checking status of the processor to determine whether it is time to wake up from a forced idle state (e.g., due to the processor not meeting its power or performance target anymore); temporarily disabling forced idle initiation due to one or more logical processors' inability to enter this state; and providing a software interface to allow the OS to dynamically enable or disable processor-initiated forced idle states, among other such operations.

In some embodiments, a processor-initiated forced idle operation implements a flow of control from hardware firmware having power and performance control heuristics, into the core and micro-code that executes an OS-initiated low power state entry. In turn, exit from the forced idle state follows a similar flow starting at hardware firmware, which causes the core to wakeup. The micro-code then resumes a regular execution flow.

In an embodiment, processor firmware heuristics may define active and forced idle periods to meet expected performance and maximize idle time to gain energy. Although the scope of the present invention is not limited in this regard, in an embodiment this determination of active and idle times may be by estimating the amount of idle time compared to the active time based on the OS firmware heuristics performance request. It can be done by the assumption that forced idle time can be taken as execution time or to be subtracted from the total measured time. In both cases, the duty cycles activities can be counted as changes in the actual usage frequency. One more side effect of this method is that the different logical processors and graphics activities can be aligned in order to increase the actual package level idle time and in this way to save energy.

When a forced idle state determination is made, logic may send appropriate control signals to one or more compute engines. However there is no need to communicate such signaling to engines that are already in a given low power state, in some embodiments. Thus the logic may not send forced idle requests to cores that are already in at least a selected low power state (e.g., a state in which one or more core clocks are disabled). In an embodiment, a processor-initiated forced idle request, upon receipt by core logic, triggers a micro-code flow for a low power state entry, although a special flow can be used in other embodiments (or in certain situations). In any case, if a thread of a core is executing a critical code sequence, the forced idle request may be rejected. In an embodiment, the micro-code or core hardware may reject the forced idle request, while in other cases logic of the core may issue the rejection. Example critical sequences include code sequences guarded with a mutex, interrupt service routines, context switching code and other ring 0 operations. Other examples include specific types of application code that cannot break for forced idle action. Similarly, the core may be in a special micro-architectural state that prevents it from entry into a forced idle state. In some cases, the OS itself explicitly prevents the processor from entering the forced idle state. Such prevention can be done for example during real time execution flow or user level device driver that again does not break by the hardware and enter into forced idle. Code like this can be defined as any code that the software assumes that the OS scheduler may not able to be break as part of its typical scheduler activity.

Note that in many cases, forced idle inhibit situations may be expected to last for short periods of time, e.g., up to a few 10's of micro-seconds (uSec). As such, a forced idle request may be defined as a level event that remains pending in the code level hardware until serviced or until canceled.

Various situations may cause a forced idle exit. For example, processor firmware heuristics may change a forced idle period in order to meet power or performance optimizations. Or an OS may disable the processor or one of its threads from entering the forced idle state. Also in some embodiments, cores that were validly placed into a forced idle state may thereafter be forced to exit the state, e.g., when the OS disables entering forced idle state or a forced idle request does not occur for another reason. Note also that in such situations, any pending requests for other cores to enter the forced idle state may be cancelled. Still further, firmware may prevent forced idle entry until a given reason that the forced idle prevention is resolved.

Figure 3:
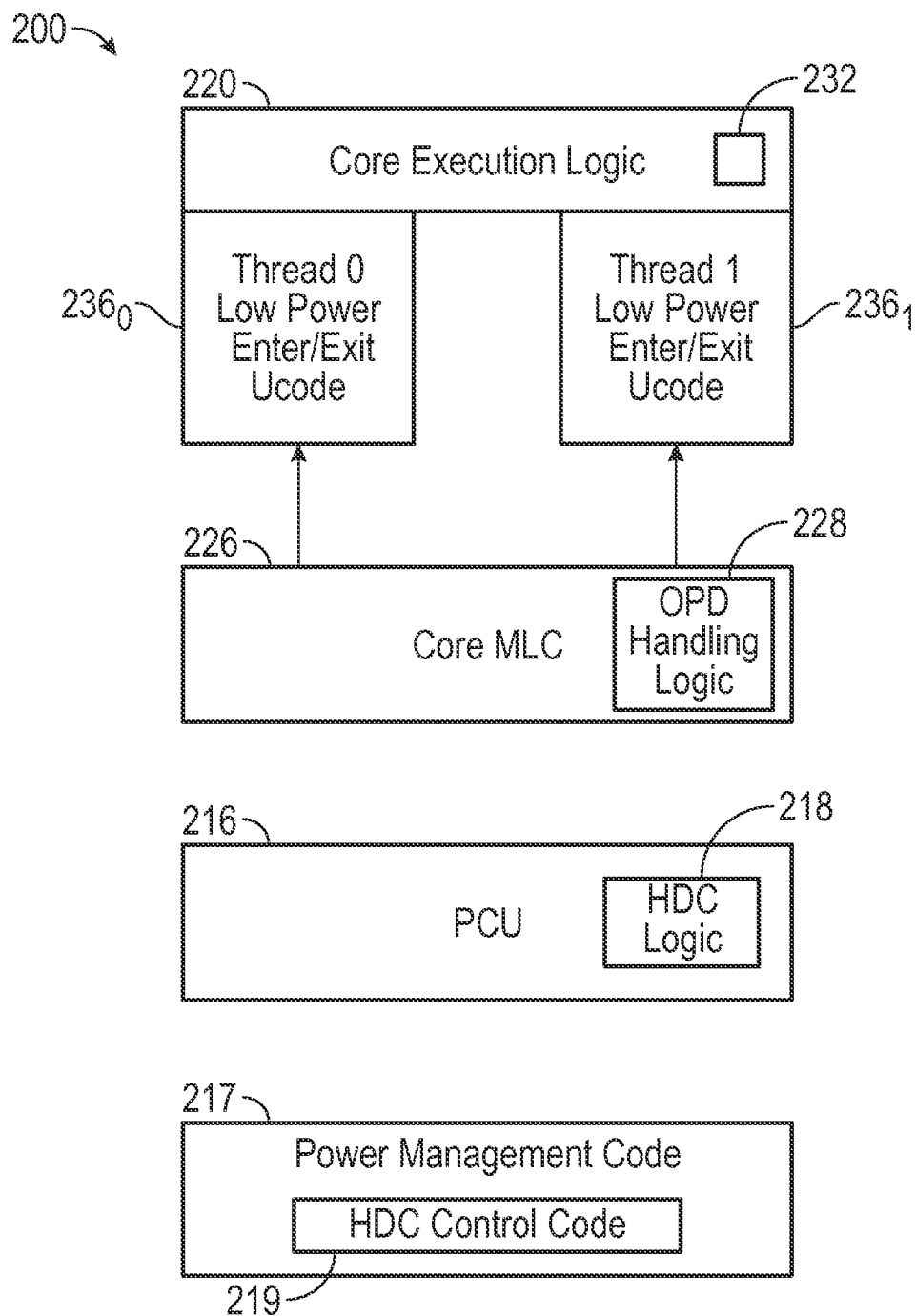
FIG. 3 is a block diagram illustrating interaction between various hardware components in a multicore processor environment.

Referring now to FIG. 3, shown is a block diagram illustrating interaction between various hardware components in a multicore processor environment. As shown in FIG. 3, processor 200 may be a more detailed example of the logical illustration of processor 200 of FIG. 2 and includes a PCU 216 including an HDC logic 218. In various embodiments, HDC logic 218 may handle forced idle operations on behalf of PCU 216. To this end, logic 218 may execute various code stored in a storage 217, namely power management code that includes HDC control code 219. Such code may include one or more sequences configured to perform control of HDC operation, including forced idle selection, entry and exit, synchronization and cancellation, among other activities.

In turn, PCU 216 communicates with various hardware of a processor including a core mid-level cache (MLC) 226 that includes OPD handling logic 228. Understand that while shown in this example with HDC logic 218 communicating with core MLC 226, in other implementations such communication path may be to other hardware of a core or other compute engine. Also understand that OPD handling logic can be in other core components in other embodiments. Note that this logic may also support the inhibit of the OPD event. Also an OPD event that is masked by the core inhibit waits pending in this level until the inhibit is cleared or the PCU removes it by OPD exit.

In general, OPD handling logic 228 is configured to determine whether an incoming instruction to enter into a forced idle state is allowed (e.g., based on whether such state is enabled or disabled). If enabled, OPD handling logic 228 may communicate a trigger command to other core hardware, namely various hardware within a core 220. This trigger command may cause execution of a low power microcode $236_0$ associated with a given hardware thread of the processor. For example, shown in FIG. 3, OPD handling logic 228 may communicate a trigger command to microcode 236 associated with a first hardware thread (and/or microcode $236_1$ associated with a second hardware thread) such that the corresponding hardware thread is to enter into a forced idle state. Note that this microcode-initiated entry into the low power state may be implemented using an available low power microcode for entry into a given low power state such as a given C-state (e.g., a relatively deep low power state such as a C3 or deeper state).

Note that in various embodiments, hardware within core 220 may prevent entry into a forced idle state by appropriate control of an indicator 232, details of which are discussed further below. Suffice to say, when a core is executing in particular state in which it is not to be interrupted, indicator 232 may be set to an inhibit state to prevent entry into the forced idle state. Although shown at this high level in the embodiment of FIG. 3, understand that alternatives and variations are possible.

The processor evaluates the benefit of keeping the cores in a forced idle state and initiates a wakeup if inefficient. In some cases, the forced idle state is efficient only when an entire processor package is forced into idle state. In these cases, logic may prevent entry of other cores (or other compute engines) into the forced idle state in case one of the cores cannot join. If the processor is unaware that one or more cores failed to enter a requested forced idle state while other cores did so, logic may wake up the latter cores when it realizes that this situation has occurred.

Logic of the processor such as monitor logic may monitor various activities within a system in order to make an informed decision as to whether to enter into a forced idle state. Although the scope of the present invention is not limited in this regard, such activities may include level of direct memory access (DMA) traffic, non-deferrable interrupts rate, etc. Those scenarios normally shorten the time that a processor can stay in an idle state, reducing the potential benefit of entry into a forced idle state.

In some embodiments, a processor provides a mechanism for a core or other compute engine to broadcast its ability or inability to enter a forced idle state to other parts of the processor. Such communication prevents most requests that would otherwise end up with an inefficient entry and immediate exit from a forced idle state. Also, embodiments may include micro-code to handle a race condition.

Figure 4:
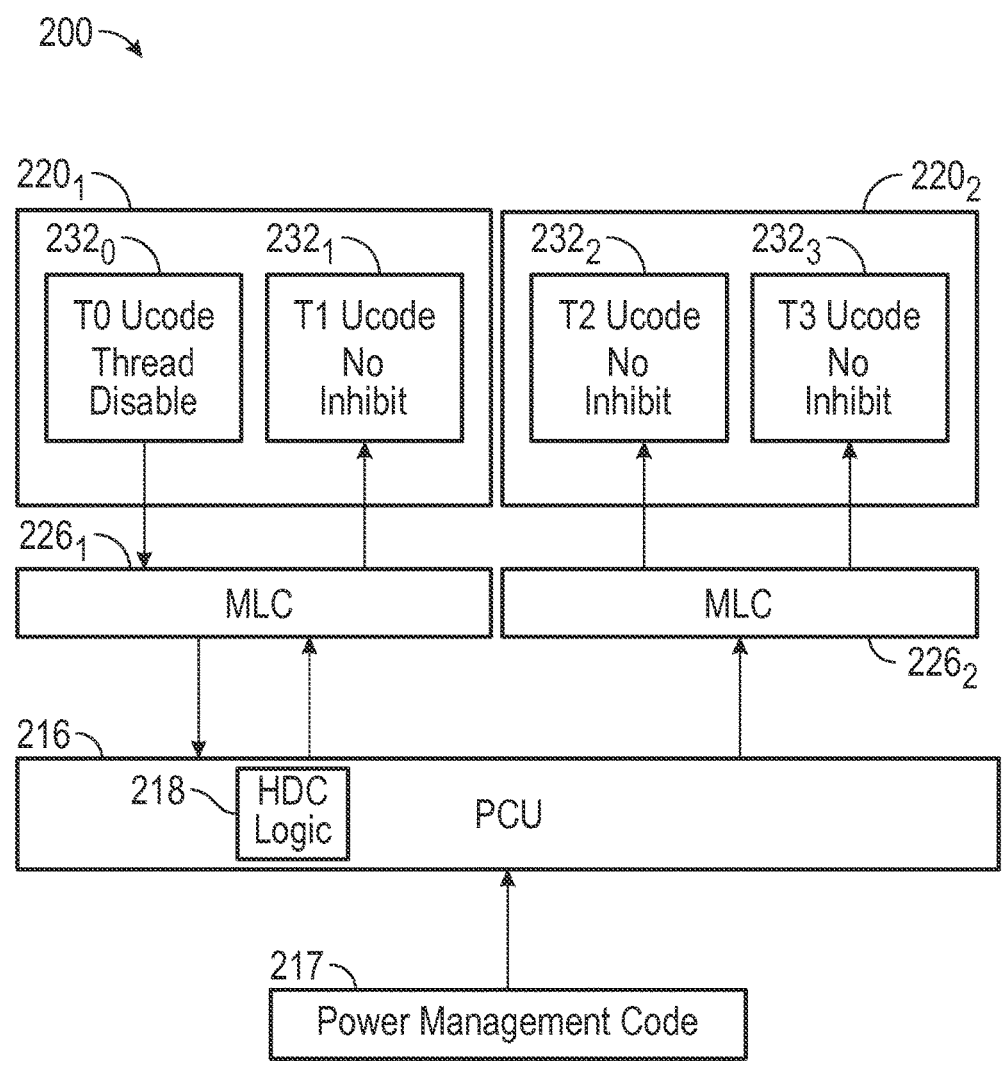
FIG. 4 is a communication flow for handling package level control for forced idle state entry and exit in accordance with an embodiment.

Referring now to FIG. 4, shown is a communication flow for handling package level control for forced idle state entry and exit in accordance with an embodiment. As shown in FIG. 4, processor 200 may be configured the same as processor 200 of FIGS. 2 and 3. In general, downstream communication is to the HDC master and upstream communication is to the individual cores/threads. Note in this instance, a first thread executing on a first core $220_1$ is disabled from entering into a forced idle state via setting indicator $232_0$ to a disabled state. Although the scope of the present invention is not limited in this regard, examples of situations in which a thread may be prevented from forced idle entry include execution of OS or other supervisor code (such as ring zero code), execution of a critical section of a program, among others. As also shown in FIG. 4, all remaining hardware threads are not prohibited from entering into a forced idle state (by appropriate setting of indicators $232_1$-$232_3$). Also assume that prior to receipt of a message in PCU 216 from the first thread to indicate that it is disabled from entry into a forced idle state, HDC logic 218 previously sent a forced idle state request to the other threads, and that one or more of these threads, responsive to a trigger signal from corresponding MLC's $226_1$ and $226_2$, entered into a forced idle state. As one such example, assume that these logical processors each entered into a given low power state (such as an ACPI C3 or deeper low power state, however note that a given processor's state support may be different than ACPI mapping).

Thereafter, responsive to an inhibit signal from the first thread or as a result of an expiration of a watchdog timer that indicates that this thread did not enter into an appropriate low power state, PCU 216 via HDC logic 218 may then send a forced idle state exit request to the other threads to cause them to exit a given low power state (entered responsive to a forced idle request) and return to an active state, as there is an asymmetry present in the processor with regard to entry into the forced idle state. Although shown at this high level with regard to this discussion, understand that it is possible in other implementations to enable only one or a small number of logical processors, cores, and/or other computing engines to enter an appropriate low power state to effect forced idle state maintenance for less than all of the compute engines of a processor.

In various embodiments, software may monitor and control enabling/disabling of forced idle states. Such control can be done at the package level or at the logical processor (hardware thread) level. Software may also tune and configure the duty cycle (ratio of active vs. forced idle time), the maximum idle time and minimum active time, the target C-state for a forced idle state, and duty cycle level.

Software may also count forced idle cycles when frequency changes occur. Monitoring of a forced idle period may include measurement of a forced idle residency at hardware thread level, core, and/or package level. In an embodiment, a core and package are considered to be in a forced idle state if at least one of the logical processors within the core or the package is in forced idle state Note that forced idling may cause an indirect impact on other architectural features such as software monitoring of effective frequency (as forced idles reduces it). For example, software that uses a performance counter-based mechanism to monitor effective frequency may configure the processor to stop the APERF machine specific register from counting cycles during a forced idle state and continue counting cycles with the MPERF MSR while in a forced idle state. Embodiments may enable the processor to support such dynamic configuration of these and other performance counters, e.g., under OS or other supervisor software control. Based on such configuration, software can take into account the forced idle time when computing C0 residency. Embodiments may also reduce a thread stall counter delta since previous computation from the time between C-state exit and OS initiated C-state entry and an MWAIT instruction.

Embodiments thus provide hardware forced idle states that may enable shorter active/idle periods triggered by micro-architectural situations such as power limitations, energy saving hardware heuristics, among others.

When a processor is operating in a power constrained environment, it typically decreases operating frequency until the power constraint is satisfied. Depending on the power limit set by processor manufacturer/OEM and the operational conditions, the processor may have to limit operating frequency below a point that is considered the maximum efficiency point. As used herein, a "maximum efficient point" is an operating frequency level below which both performance and energy is lost relative to this most efficient point. While working under this point, performance degrades sub-linearly with power decrease. This degradation occurs because below the maximum efficiency point, active components' power decreases linearly with frequency, but non-active power such as leakage and other system components (such as memory and IOs), still have the same power usage. Therefore, a performance/power ratio may decrease, possibly dramatically, as operating frequency reduces below the maximum efficient point.

Figure 5:
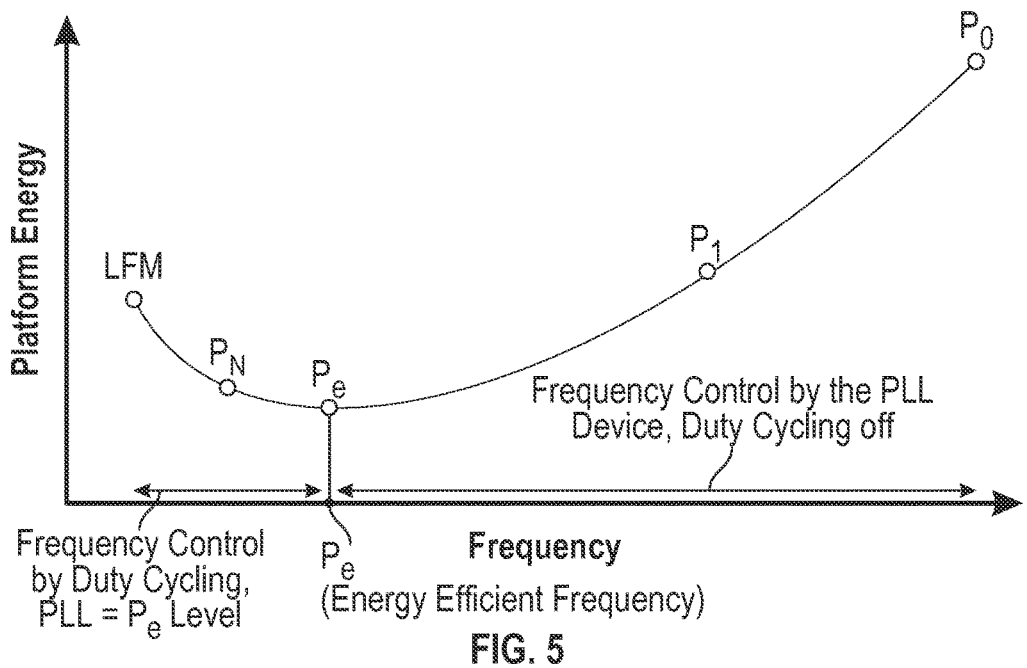
FIG. 5 is a curve describing the range of operation of a frequency generator device in accordance with an embodiment.

Referring now to FIG. 5, shown is a curve describing the range of operation of a frequency generator device in accordance with an embodiment. As shown, the range of duty cycling occurs when the PLL device is set at Pe (maximum efficient frequency) level, and a request is for a lower operating frequency.

In FIG. 5, P0 corresponds to a maximum turbo frequency, P1 corresponds to a guaranteed maximum frequency (which may be an arbitrary marketing level), Pe corresponds to an energy efficient frequency (the maximum efficient point), and LFM is a lowest frequency (e.g., 400 MHz in an embodiment).

Embodiments may thus use HDC or OPD in a power constrained environment to halt computing engines. Although HDC or OPD may be used regardless of processor workload, in some embodiments compute engines may be placed into a processor-initiated forced idle state in situations where no high QoS work is being executed. Other workloads, e.g., ring 0 work (such as handling interrupts), may prevent a corresponding compute engine from entering into a forced idle state.

In a power constrained environment, where a controlling entity (e.g., OS, power control unit or other entity) requests an operating frequency below the maximum efficient frequency point, one or more (up to all) compute engines (or at least cores, in one embodiment) can be duty cycled in order to gain power and increase operating frequency.

In a situation where a processor is power limited and a requested operating frequency is below the most energy efficient frequency point, HDC logic may cause some or all cores (and/or other compute engines) to enter into forced idle states (e.g., a C6 state) for a short period of time (e.g., less than approximately 1-5 mSec). Embodiments may maintain a minimum amount of time (e.g., approximately 300 uSec) between two consecutive operations of OPD in order to maintain QoS. By sending all cores into an appropriate low power state, and provided that no other component is currently working (graphics engine or so forth), the package may also enter into a package low power state, gaining additional power budget. This gained power may enable the processor to operate at a higher operating frequency and enable the option to operate in the most efficient frequency level, and thus to increase the performance results thus improving efficiency. In an embodiment, the target frequency as a result of duty cycling is the maximum efficient frequency. Once this target is achieved, OPD is exited, and the processor may continue to operate at this maximum efficient frequency point or above it.

Figure 6A:
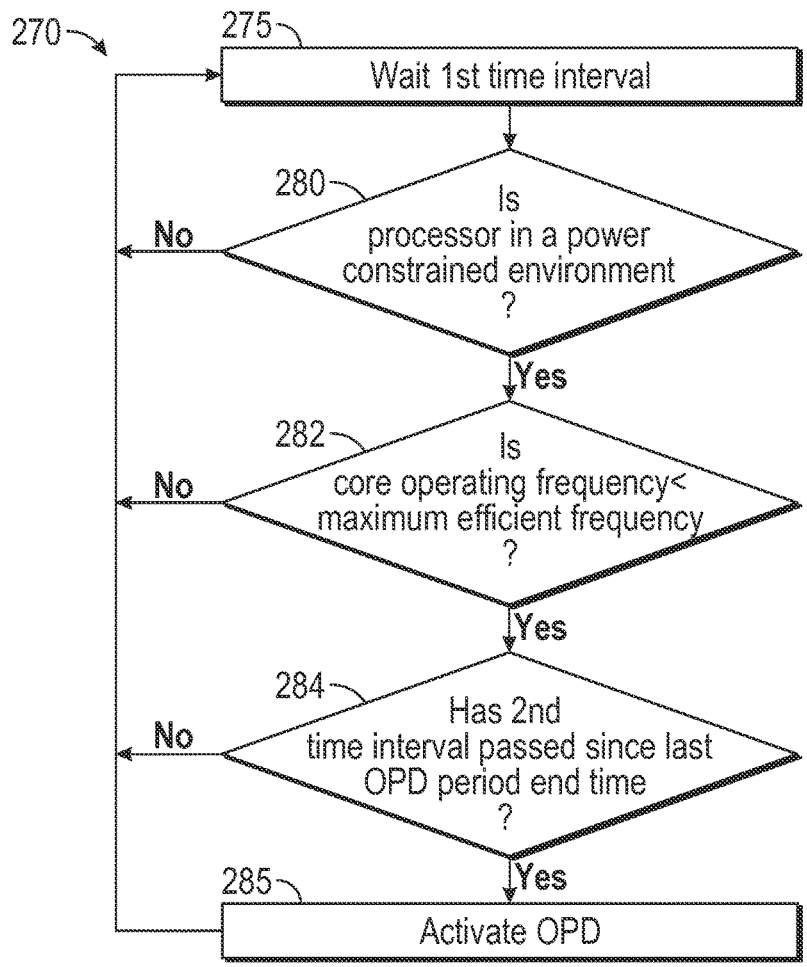
FIG. 6A is a flow diagram of a method for controlling processor operating frequency in accordance with an embodiment of the present invention.

Referring now to FIG. 6A, shown is a flow diagram of a method for controlling processor operating frequency in a power constrained environment in accordance with an embodiment of the present invention. As shown in FIG. 6A, method 270 may be performed by various hardware of a processor such as an HDC logic of an internal PCU. However, understand that in other implementations method 270 may be performed by other hardware, software and/or firmware associated with a processor.

As seen, method 270 begins by waiting for a first time interval (block 275). As an example, this first time interval may be of a relatively short duration, e.g., approximately 50 uSec, in an embodiment. Next control passes to diamond 280 to determine whether the processor is in a power constrained environment, e.g., is exceeding or is about to exceed a power budget.

In the presence of such constraint, control passes to diamond 282 where it can be determined whether a core operating frequency is less than a maximum efficient operating frequency. For example, in many embodiments an OS-based power management technique or other scheduling logic may request an operating frequency that is below this maximum efficient operating frequency.

If a constrained environment is present, control passes to diamond 284 to determine whether another time interval has passed since a last OPD operation concluded. Although the scope of the present invention is not limited in this regard, in an embodiment this second time interval may be on the order of approximately 300 uSec. If such time duration has passed since the last OPD execution, control passes to block 285 where OPD or HDC operation again may be enabled to thus allow the core to operate at its most efficient point (namely at a frequency of Pe) and implement duty cycling to cause the core to operate with active states and forced idle states. Understand that while shown at this high level in the embodiment of FIG. 6A, the scope of the present invention is not limited in this regard.

Thus as seen in FIG. 6A, operating frequency may be tightly controlled and a demand to reduce operating frequency below the most efficient frequency point may be translated to a package C-state duration. As such, method 270 translates a frequency reduction request due to a power limitation to duty cycle control. Thus in fully active power limited scenarios, a processor may be placed into idle periods to enable operating at an operating frequency higher than a requested operating frequency during active periods.

Forcing a processor into an idle state also can be used as a mechanism to enable better alignment between different threads, thus saving power. However, forcing an executing core into an idle state may have a negative effect on the overall performance or QoS. Embodiments may further provide heuristics to balance these competing actions.

The control of the processor frequency is done either by the OS or by the hardware itself. At the lowest level, processor frequency is controlled by a physical clock device such as a phase lock loop (PLL) or other clocking logic. Processor logic dynamically computes the most efficient frequency level. Based on this determination, HDC logic may dynamically clamp operating frequency up to this most efficient point to avoid a lose-lose situation in case higher level algorithm layers or the OS request is to operate at a lower operating frequency.

In HDC operation, HDC logic may control some or all of the processor resources to break continuous operation (e.g., of the cores) into periods of higher speed execution followed by periods of low power states. The active portion of the duty cycle may be defined as the ratio between the OS or HW-requested operating frequency and the dynamically computed most efficient frequency level. For example, if the OS requests to execute at half the most efficient level, the physical frequency generator (e.g., PLL) may be configured to operate at the most efficient level (twice as high as the requested frequency) and the cores will be forced to be in a forced idle state for a 50% idle duration.

In terms of overall average performance, the OS may observe the frequency it requested, e.g., via the MPERF/APERF counters, even if the actual processor dynamics are quite different. In case the OS or hardware requests a low operating frequency level due to a low utilization workload and this low operating frequency meets the workload QoS requirements, initiating HDC operation to provide for forced idle states can improve the alignment between the various compute engines, thus saving energy. Embodiments thus obey the OS requirements and still enable energy savings. Without such duty cycling, a processor may enter into a throttling state, which is a much more drastic and less efficient mode of operation.

Another method to realize unified HDC operation is to include a control logic to monitor that the OS (e.g., by a driver operating according to OS-based heuristics) can enter into idle states by itself. In this way, a frequency control loop can be supported either by the OS or by hardware, and which may use active and idle residency times as a hint for its heuristics, will not be masked by OPD operation.

Figure 6B:
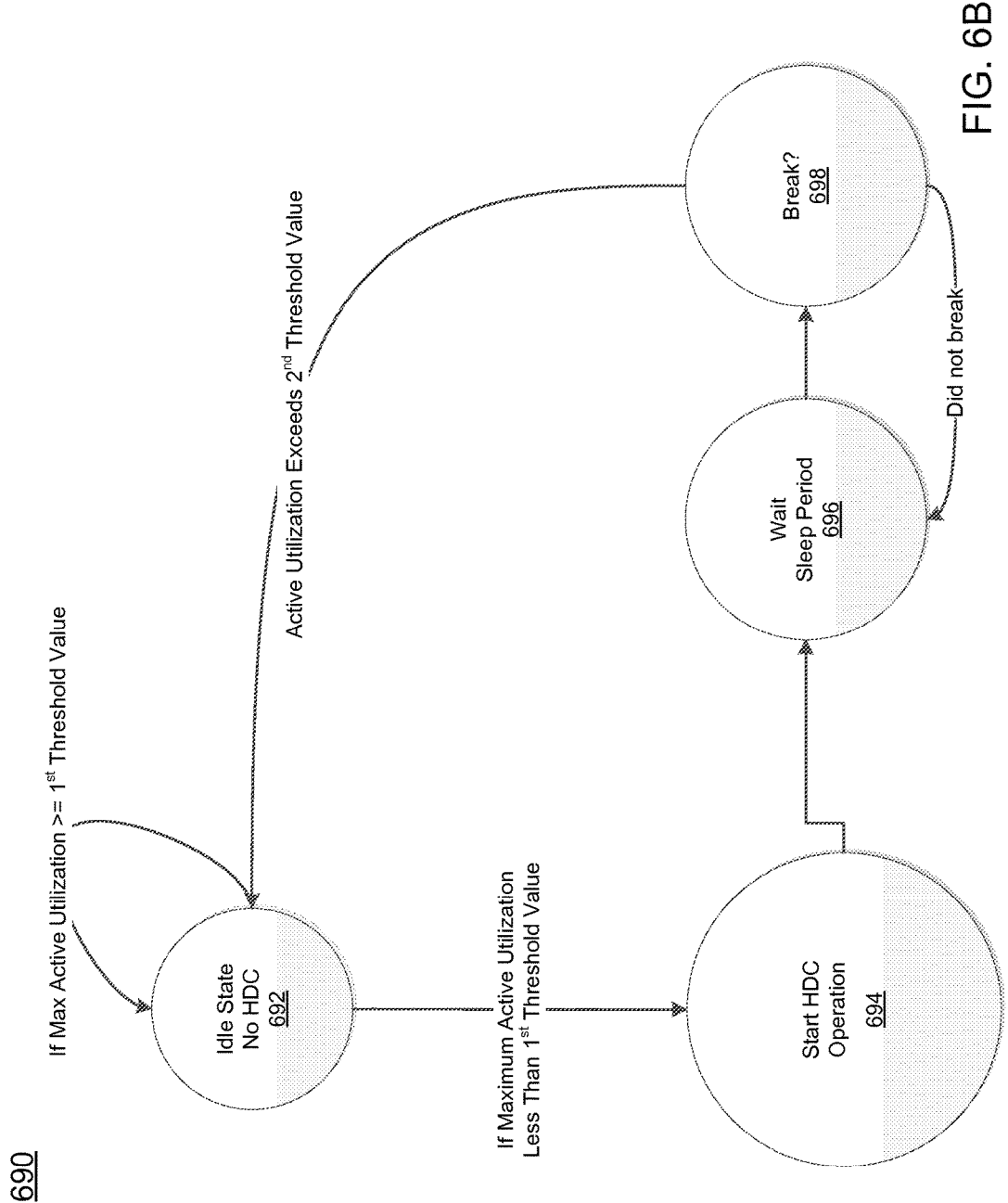
FIG. 6B is a flow diagram of an HDC control method in accordance with another embodiment.

Referring now to FIG. 6B, shown is a flow diagram of an HDC control method in accordance with another embodiment. As shown in FIG. 6B, method 690 may be implemented by HDC logic (and/or by processor hardware or firmware) and can provide an interface to interact with an OS or other driver that provides a direct control of OPD by setting a desired duty cycle. Further, method 690 may take effect only if such OS or other driver does not provide a OPD control support and a processor is not operating in a power limited situation (e.g., and instead is operating at a low utilization level or executing semi-active workload).

In such instances, method 690 may begin in an idle state 692 in which some or all of the processor is in an idle state (but not according to a forced idle state). State 692 may be active while a maximum active utilization of the processor over a given evaluation interval (e.g., 30 mSec, in an embodiment) is greater than or equal to a first threshold value. In one embodiment, this first threshold value may correspond to an activity level of 20%. If instead the maximum active utilization falls below this utilization level, control passes to state 694 in which HDC operation may begin. In an embodiment, HDC operation may begin with a predetermined duty cycle schedule, e.g., 50% active states and 50% idle states. This relatively high duty cycle level provides for headroom to enable an OS or other scheduling logic to accommodate its idle states. Next a wait state 696 is entered in which method 690 sleeps for a predetermined period (e.g., 1 mSec). Then it can be determined whether a break event has occurred (state 698). If not, control passes back to state 696.

If instead a break is determined at the conclusion of the wait state, analysis may be made to determine whether the active utilization for an evaluation interval exceeds a second threshold value. In an embodiment, this second threshold value may be set at 30%, to avoid hysteresis. If the active utilization does exceed this second threshold value, control passes back to state 692, in which the HDC operation is exited. Otherwise, continued HDC operation occurs and control flows back to state 696. Understand that while shown with this particular implementation in FIG. 6B, many variations are possible.

Figure 7:
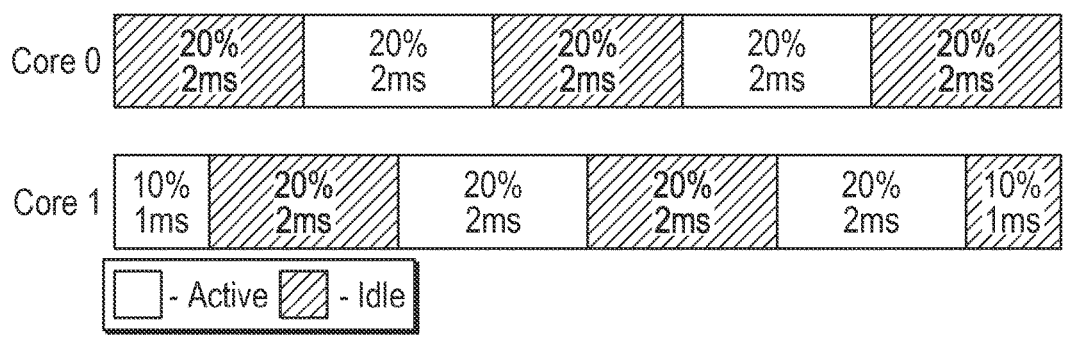
FIG. 7 is an original scheduling of two threads of execution and a revised scheduling using hardware duty cycling in accordance with an embodiment.
Figure 7:
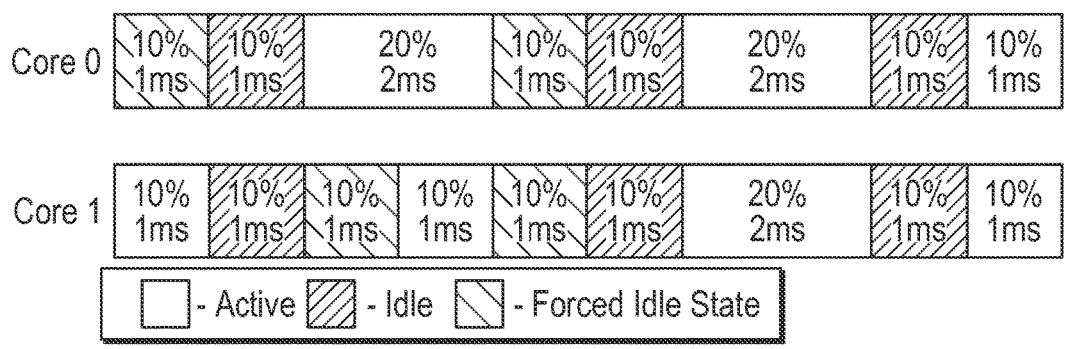

Referring now to FIG. 7, shown is an original scheduling of two threads of execution and a revised scheduling using hardware duty cycling in accordance with an embodiment. As seen in FIG. 7, an original schedule and a modified schedule in accordance with an embodiment are provided for workloads to be performed on 2 cores. As seen in schedule A, the unshaded portions of time for each core represent an active state, and the shaded portions represent an inactive or idle period. Thus schedule A shows various active times and idle times as scheduled by scheduling logic of the OS. Furthermore, given the relatively low workload level being executed on both cores, also assume that the OS requests an operating frequency that is below the maximum efficient operating frequency point. Note also that in original scheduling A, there is very little synchronization between active states and idle states for the multiple cores, which are present within a multicore processor. As such, the ability for the multicore processor package to enter into an appropriate package low power state is also limited.

Instead by providing a revised scheduling in accordance with an embodiment, e.g., as realized by HDC logic of a processor, hardware duty cycling enables greater synchronization between active and idle state of the cores. Thus as shown in schedule B, greater synchronization is realized with the inclusion of forced idle states, represented as cross-hatching in the schedule B illustration. Furthermore, greater amounts of idle states are provided for, in that the cores are controlled to operate at least at the maximum operating frequency point level, such that the relatively light workloads can be performed in lower amounts of time, enabling greater idle periods.

Due to the duty cycling, it is possible to increase package idle time (e.g., from 20% to 70% in this example), saving much energy. In embodiments, note that the OS visible C0% is not changed as a result of duty cycling and this change in operating frequency is transparent to the OS in terms of delivered average performance, so that OS behavior stays same.

Figure 8:
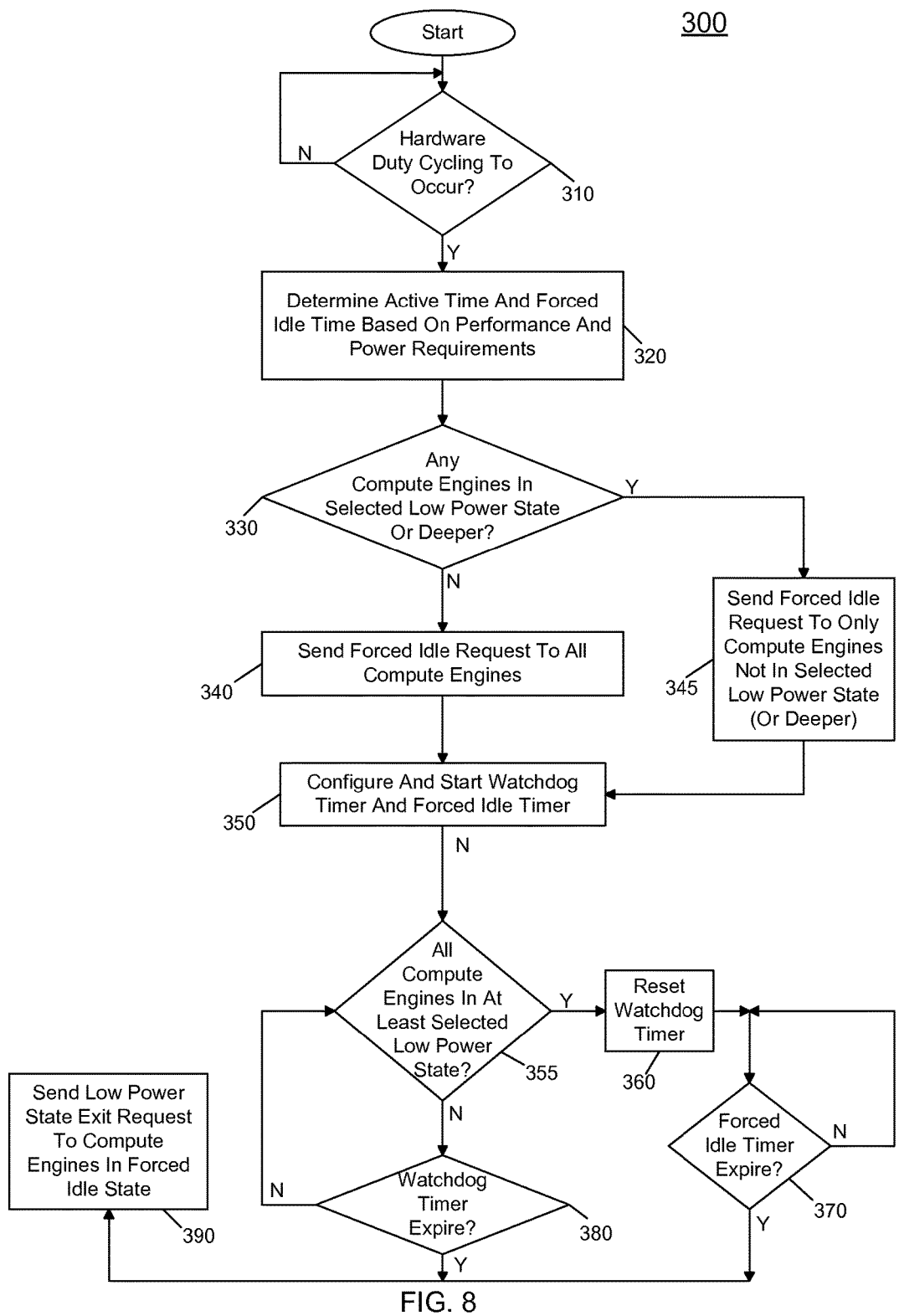
FIG. 8 is a flow diagram of a method for performing HDC operation in accordance with another embodiment of the present invention.

Referring now to FIG. 8, shown is a flow diagram of a method for performing HDC operation in accordance with another embodiment of the present invention. As shown in FIG. 8, method 300 may be performed using various logic of a processor, including a power controller and HDC logic. Embodiments may utilize additional processor hardware such as forced idle state (FIS) indicators associated with each hardware thread of one or more cores, along with a package level FIS indicator. In addition, a processor may include various hardware counters, including counters to count cycles in which the processor is in a given low power state. Furthermore, additional performance counters may be configured to provide a count of cycles when a processor is active and a count of cycles of processor operation, even during an inactive state.

As seen, method 300 begins by determining whether hardware duty cycling is to occur (diamond 310). If so, at block 320 the duty cycle parameters including active and idle times are determined. For example, the determination may be based on a requested operating frequency and a maximum efficient operating frequency such that during active periods operation occurs at the maximum efficient operating frequency. Thus overall, an effective operating frequency corresponds to the requested operating frequency.

Next at diamond 330 it is determined, prior to entry into hardware duty cycling operation, whether any of compute engines are already in a selected low power state (or deeper low power state). Although the scope of the present invention is not limited in this regard, in different situations the selected low power state may be a C3 or C6 low power state. If no compute engines are in such state, control passes to block 340 where a forced idle request is sent to all compute engines. Note that if one or more compute engines are in at least the selected low power state, control instead passes to block 345 where the forced idle request is only sent to those compute engines not in such state.

In either case, control passes next to block 350 where various timers may be configured and initiated. Specifically, a watchdog timer may be set to a value of time that exceeds (at least slightly) the length of time for a core to enter into a low power state (to enable a determination whether one or more cores was inhibited from entering the low power state). In an embodiment, this watchdog timer may be set to a value between approximately 20 and 50 uSec. And, the forced idle timer may be set to a larger value that corresponds to a duration of the forced idle state, which in various embodiments may be on the order of between approximately 300 usec-10 msec.

Next, at diamond 355 it is determined whether all compute engines have entered at least a selected low power state. If so, the watchdog timer may be reset (block 360), and then idle state operation occurs until it is determined that the forced idle timer has expired (diamond 370). Upon the expiration, control passes to block 390 where a low power state exit request is sent to the compute engines that are in the forced idle state (but not those cores that are in a native idle state). Thus such engines are sent back to an active state to handle pending workloads. Of course if a core was already in a native low power state, no exit request is sent to such core.

Still referring to FIG. 8, if instead at diamond 355 it is determined that not all compute engine have entered into a low power state, control passes to diamond 380 where it is determined whether the watchdog timer has expired. If so, this means that one or more compute engines was unable to enter into the forced idle state, e.g., due to a disable indicator (set due to a given workload that the engine is processing). In such case, control passes to block 390 where the other compute engines that successfully entered the forced idle state are caused to exit that state.

Such exit for the compute engines may occur to improve efficiency in embodiments in which forced idle states are effected only where all compute engines enter into such state, to then enable an entire processor package to enter into a forced idle state. Of course understand that in other embodiments, successfully idled cores may remain in the forced idle state for the duration of the forced idle timer without this watchdog timer expiration-initiated exit. Although shown with this particular implementation in the FIG. 8 embodiment, understand the scope of the present invention is not limited in this regard.

Figure 9:
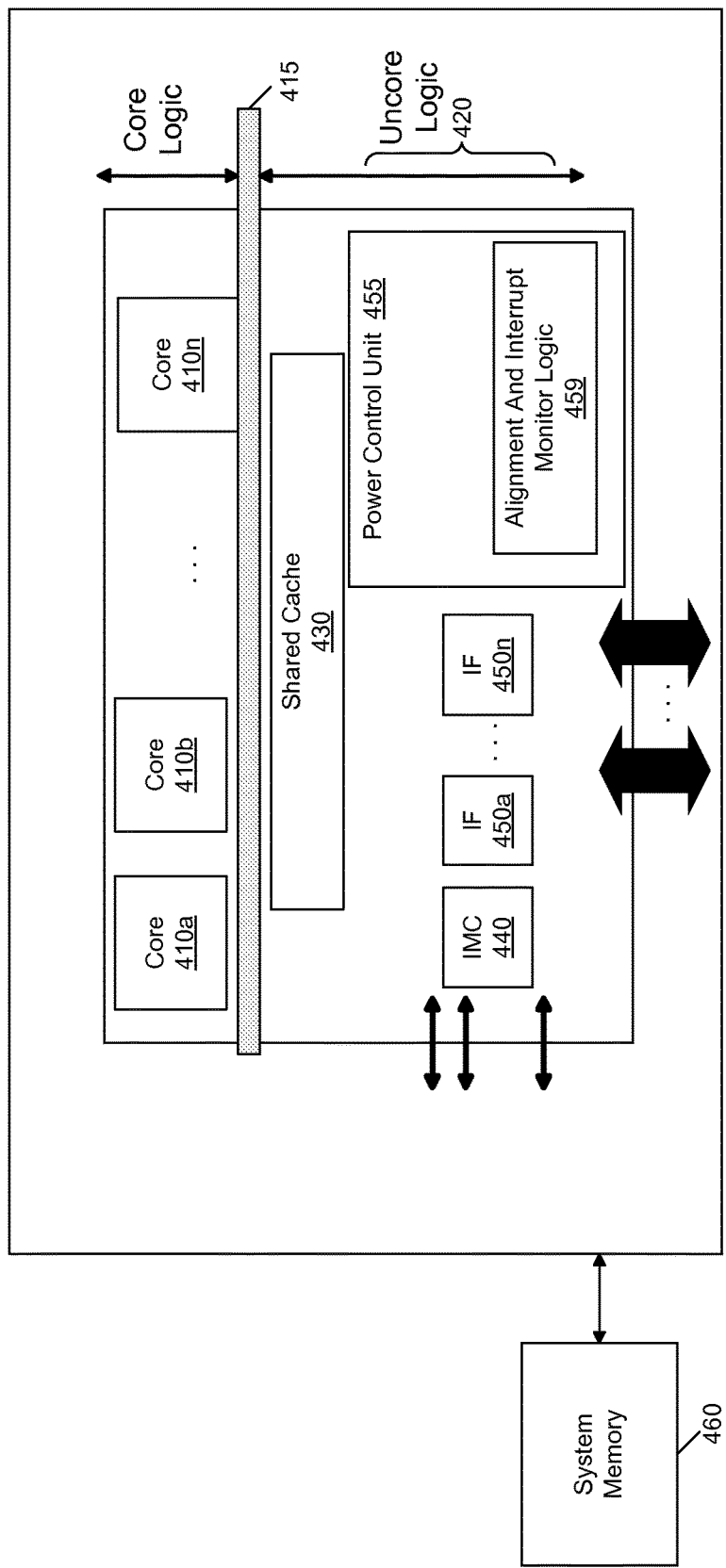
FIG. 9 is a block diagram of a processor in accordance with an embodiment of the present invention.

Embodiments can be implemented in processors for various markets including server processors, desktop processors, mobile processors and so forth. Referring now to FIG. 9, shown is a block diagram of a processor in accordance with an embodiment of the present invention. As shown in FIG. 9, processor 400 may be a multicore processor including a plurality of cores $410_a$-$410_n$. In one embodiment, each such core may be of an independent power domain and can be configured to enter and exit active states and/or maximum performance states based on workload. The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455. In various embodiments, power control unit 455 may include an HDC logic 459 in accordance with an embodiment of the present invention. Using this logic, one or more logical processors may be forced into an idle state although it has a workload to execute. Further, such logic may cause the same logical processors to exit the forced idle state before an end of an idle period if one or more other logical processors are prevented from forced idle state entry.

With further reference to FIG. 9, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 9, the scope of the present invention is not limited in this regard.

Figure 10:
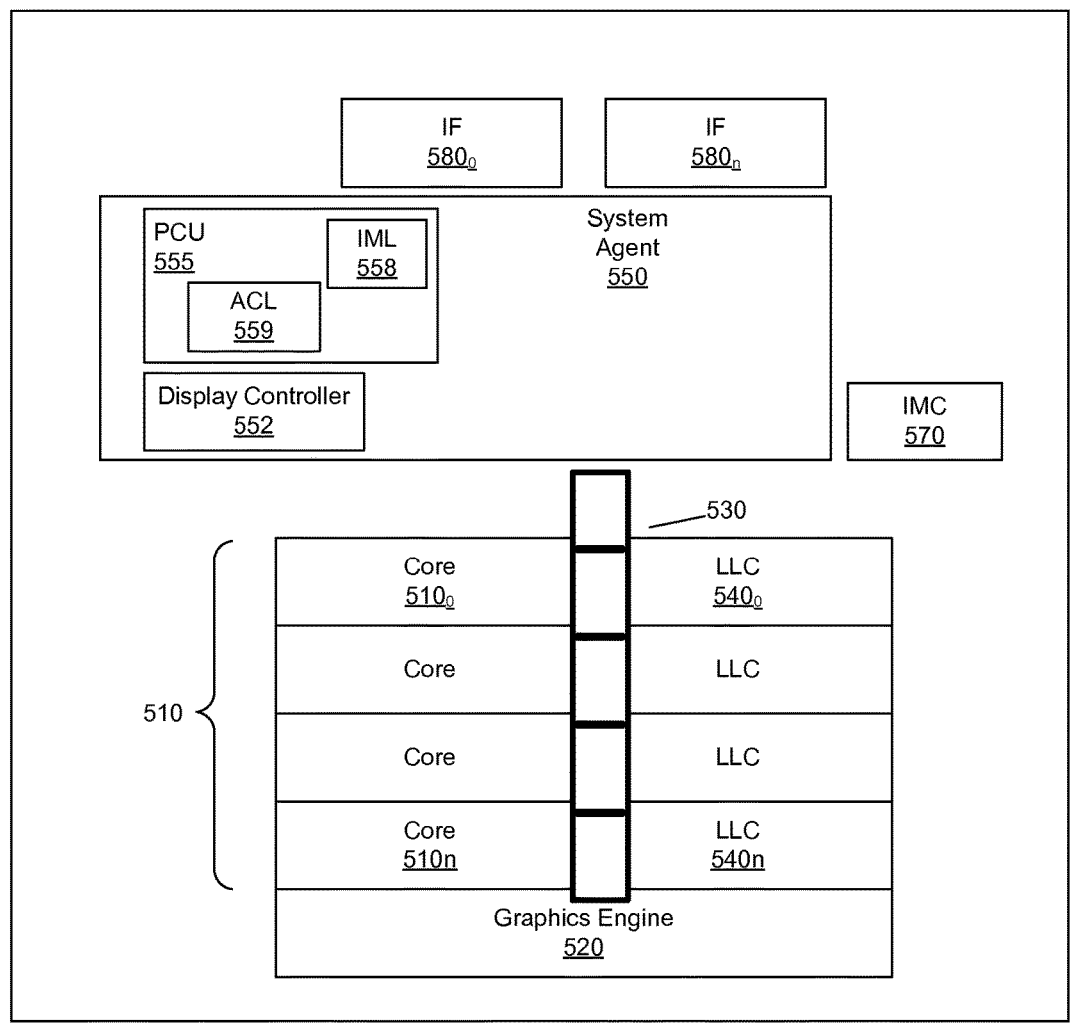
FIG. 10 is a block diagram of a multi-domain processor in accordance with another embodiment of the present invention.

Referring now to FIG. 10, shown is a block diagram of a multi-domain processor in accordance with another embodiment of the present invention. As shown in the embodiment of FIG. 10, processor 500 is a SoC including multiple domains. Specifically, a core domain 510 can include a plurality of cores $510_0$-$510_n$, a graphics domain 520 can include one or more graphics engines, and a system agent domain 550 may further be present. In some embodiments, system agent domain 550 may execute at an independent frequency than the core domain and may remain powered on at all times to handle power control events and power management such that domains 510 and 520 can be controlled to dynamically enter into and exit high power and low power states. Each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In one embodiment, interconnect 530 can be part of the core domain. However in other embodiments the ring interconnect can be of its own domain.

As further seen, system agent domain 550 may include display controller 552 which may provide control of and an interface to an associated display. As further seen, system agent domain 550 may include a power control unit 555 which can include an HDC logic 559 in accordance with an embodiment of the present invention to perform the control of force idle state entry and exit as described herein, including communication of a forced idle request to a core when it is executing a workload, and also to communicate a low power state exit request if another core is prevented from entry into the low power state and/or one or more timers expire before one or more of the cores enter into the given low power state. In various embodiments, this logic may execute the algorithm described above in one or more of FIGS. 6A, 6B and FIG. 8.

As further seen in FIG. 10, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 10, understand the scope of the present invention is not limited in this regard.

Figure 11:
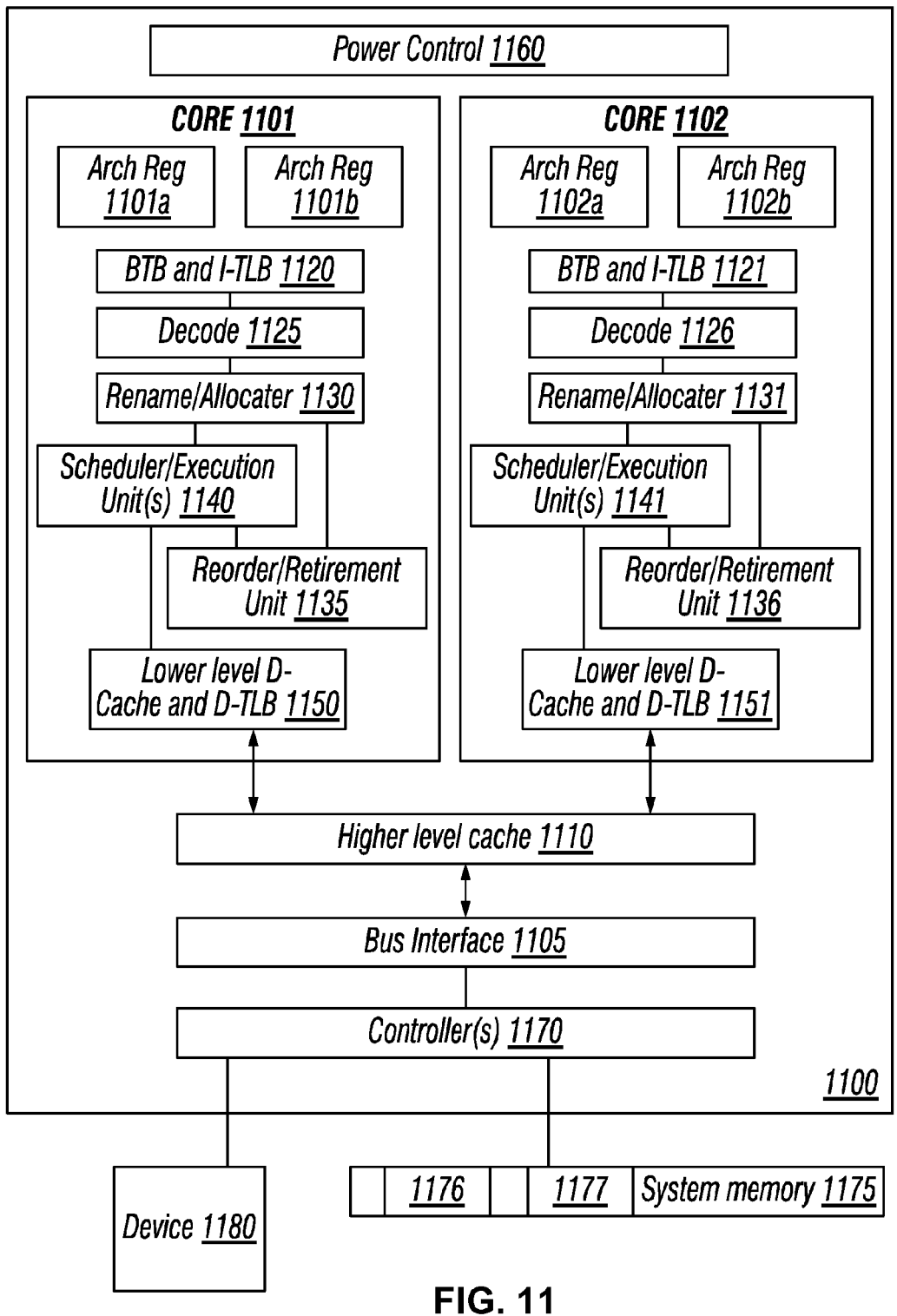
FIG. 11 is an embodiment of a processor including multiple cores.

Referring to FIG. 11, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 11, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 11, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 12:
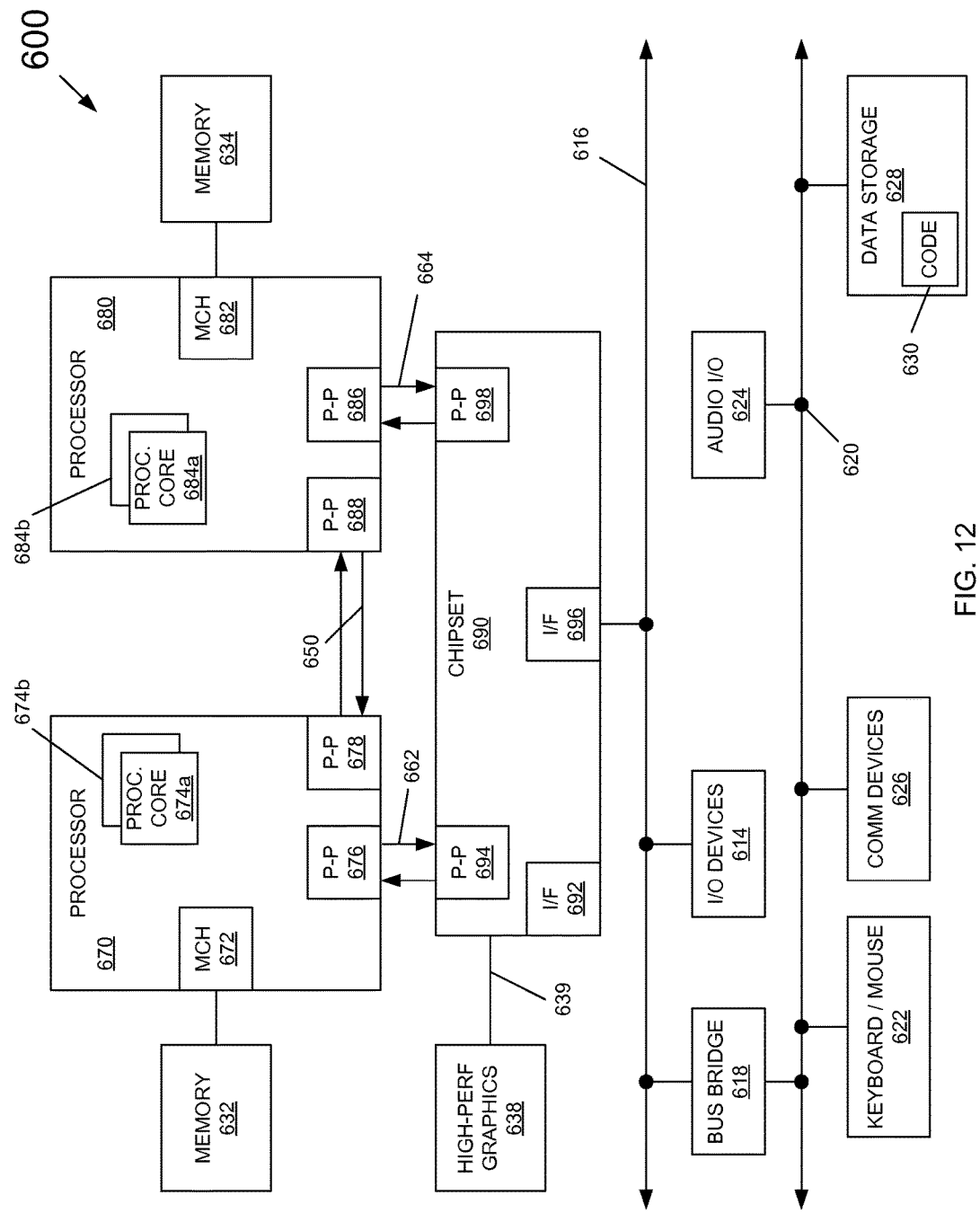
FIG. 12 is a block diagram of a system in accordance with an embodiment of the present invention.

Embodiments may be implemented in many different system types. Referring now to FIG. 12, shown is a block diagram of a system in accordance with an embodiment of the present invention. As shown in FIG. 12, multiprocessor system 600 is a point-to-point interconnect system, and includes a first processor 670 and a second processor 680 coupled via a point-to-point interconnect 650. As shown in FIG. 12, each of processors 670 and 680 may be multicore processors, including first and second processor cores (i.e., processor cores 674a and 674b and processor cores 684a and 684b), although potentially many more cores may be present in the processors. Each of the processors can include a PCU or other logic to control entry into and exit from forced idle states and to maintain appropriate counts of residency of the various cores and/or logical processors in given power consumption states. Furthermore, such logic can enable and disable entry into forced idle states, as determined based on settings of hardware, software and/or firmware.

Still referring to FIG. 12, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 12, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 12, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 12, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Figure 13:
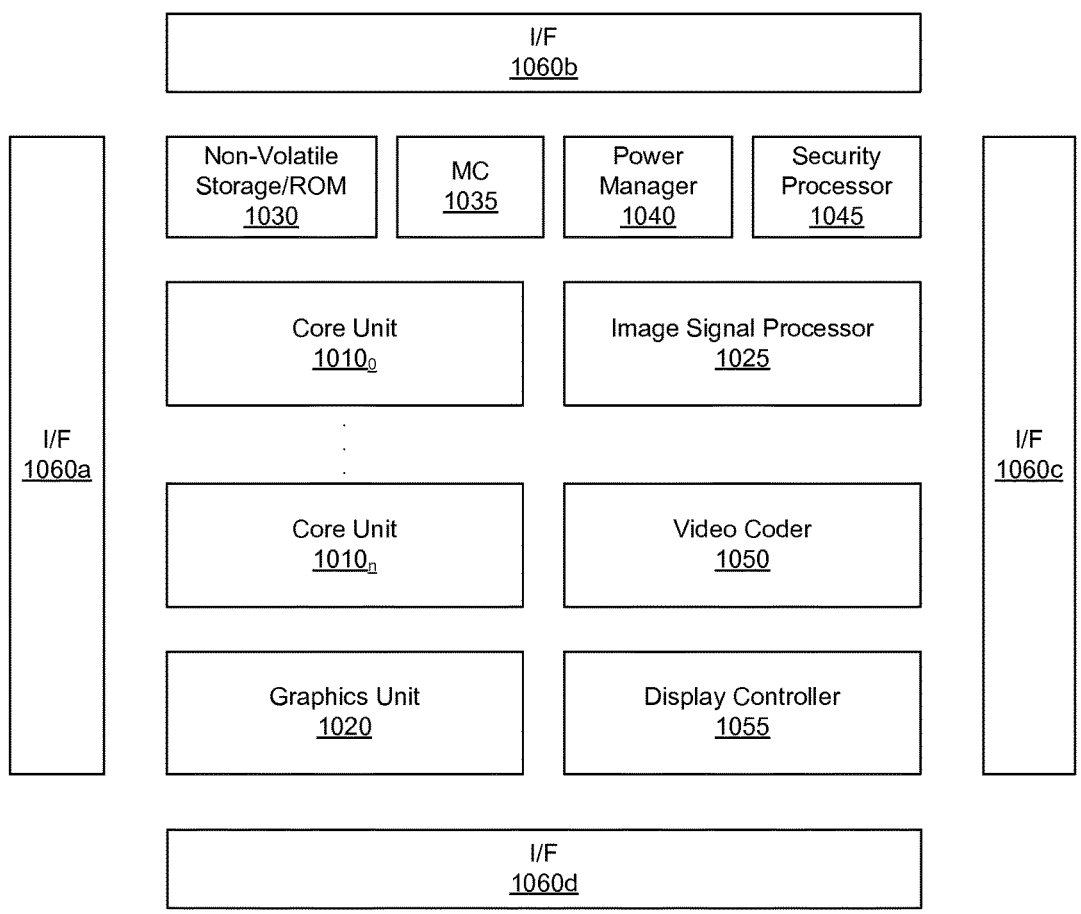
FIG. 13 is a block diagram of a processor in accordance with another embodiment of the present invention.

Referring now to FIG. 13, shown is a block diagram of a processor in accordance with another embodiment of the present invention. In the embodiment of FIG. 13, processor 1000 may be a system on a chip (SoC) including multiple domains, each of which may be controlled to operate at an independent operating voltage and operating frequency. As a specific illustrative example, processor 1000 may be an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or customer thereof or a MIPS-based design from MIPS Technologies, Inc. of Sunnyvale, Calif., or their licensees or adopters may instead be present in other embodiments such as an Apple A5 processor, a Qualcomm Snapdragon processor, or Texas Instruments OMAP processor. Such SoC may be used in a low power system such as a smartphone, tablet computer, Ultrabook™ computer or other portable computing device.

In the high level view shown in FIG. 13, processor 1000 includes a plurality of core units $1010_0$-$1010_n$. Each core unit may include one or more processor cores, one or more cache memories and other circuitry. Each core unit 1010 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.) or other instruction set or combinations thereof. Note that some of the core units may be heterogeneous resources (e.g., of a different design). In addition, each such core may be coupled to a cache memory which in an embodiment may be a shared level (L2) cache memory. A non-volatile storage 1030 may be used to store various program and other data. For example, this storage may be used to store at least portions of microcode, boot information such as a BIOS, other system software or so forth.

Each core unit 1010 may also include an interface such as a bus interface unit to enable interconnection to additional circuitry of the processor. In an embodiment, each core unit 1010 couples to a coherent fabric that may act as a primary cache coherent on-die interconnect that in turn couples to a memory controller 1035. In turn, memory controller 1035 controls communications with a memory such as a dynamic random access memory (DRAM) (not shown for ease of illustration in FIG. 13).

In addition to core units, additional processing engines are present within the processor, including at least one graphics unit 1020 which may include one or more graphics processing units (GPUs) to perform graphics processing as well as to possibly execute general purpose operations on the graphics processor (so-called GPGPU operation). In addition, at least one image signal processor 1025 may be present. Signal processor 1025 may be configured to process incoming image data received from one or more capture devices, either internal to the SoC or off-chip. Other accelerators also may be present. In the illustration of FIG. 13, a video coder 1050 may perform coding operations including encoding and decoding for video information, e.g., providing hardware acceleration support for high definition video content. A display controller 1055 further may be provided to accelerate display operations including providing support for internal and external displays of a system. In addition, a security processor 1045 may be present to perform security operations such as secure boot operations, various cryptography operations and so forth.

Each of the units may have its power consumption controlled via a power manager 1040. Power manager 1040 includes HDC logic to perform control of forced idle state entry and/or exit based on various combinations of hardware and software settings, workload activity, environmental conditions and so forth, as described herein.

In some embodiments, SoC 1000 may further include a non-coherent fabric coupled to the coherent fabric to which various peripheral devices may couple. One or more interfaces 1060a-1060d enable communication with one or more off-chip devices. Such communications may be according to a variety of communication protocols such as PCIe™, GPIO, USB, I2C, UART, MIPI, SDIO, DDR, SPI, HDMI, among other types of communication protocols. Although shown at this high level in the embodiment of FIG. 13, understand the scope of the present invention is not limited in this regard.

The following examples pertain to further embodiments.

In an example, a processor comprises: a plurality of cores each to independently execute instructions; and a power controller coupled to the plurality of cores and including a HDC logic to cause at least one logical processor of one of the cores to enter into a forced idle state while the logical processor has a workload to execute and to cause the logical processor to exit the forced idle state prior to an end of an idle period if at least one other logical processor of the of cores is prevented from entry into the forced idle state.

In an example, the processor further comprises a configuration register to enable HDC operation of the processor at a package level, where the configuration register is controllable by system software. The HDC logic may set at least one of a maximum active time and a minimum idle time for the HDC operation. In an example, the forced idle state may be invisible to the system software and corresponds to a low power state of at least a level at which a core clock is disabled.

In an example, the HDC logic may cause the at least one logical processor to exit the forced idle state at an expiration of a first timer, if all of the plurality of cores have not entered into the forced idle state.

In an example, the processor further comprises a first performance counter and a second performance counter, where the first performance counter is configured to not count cycles during the forced idle state, and the second performance counter is configured to count cycles during the forced idle state.

In an example, the processor may further comprise: a first counter for each of the plurality of cores to count cycles in which at least one logical processor of the core is in the forced idle state; and a plurality of low power state counters, each to maintain a count of a number of cycles that the processor is in a corresponding low power state.

Each logical processor of each of the cores may include an indicator to indicate whether the corresponding logical processor is enabled to enter into the forced idle state. The HDC logic may send a forced idle state request to a core if the core is not in at least a first low power state. Each of the cores may include a handling logic to initiate low power state entry microcode for the first low power state, based on an indicator for a first logical processor of the corresponding core being of an enabled state. In an example, the power controller includes a low power control logic to select an operating frequency for the processor to be at a reduced operating frequency in a power constrained environment, where the reduced operating frequency is less than a maximum efficient frequency, and the HDC logic is to cause the processor to operate at the maximum efficient frequency in the power constrained environment, via the HDC operation.

In an example, the HDC logic is to cause at least one core to be in the forced idle state while the at least one core has a workload to execute and at least one other core is in a low power state, the power controller to thereafter enable the processor to enter into a package low power state, and after the package low power state, the HDC logic is to cause the at least one core to operate at a higher operating frequency than the reduced operating frequency. In an example, the higher operating frequency is transparent to system software.

Note that the above processor can be implemented using various means.

In an example, the processor comprises a system on a chip (SoC) incorporated in a user equipment touch-enabled device.

In another example, a system comprises a display and a memory, and includes the processor of one or more of the above examples.

In another example, a machine-readable medium has stored thereon instructions, which if performed by a machine cause the machine to perform a method comprising: communicating a forced idle request to one or more cores of a plurality of cores of a multicore processor when the one or more cores are executing a workload; and communicating a low power state exit request to the one or more cores if a first timer expires prior to the one or more of cores each entering into at least a selected low power state.

In an example, the method further comprises communicating the forced idle request to any of the plurality of cores that are not presently in at least the selected low power state. The method may further comprise determining at least one of an active time and an idle time for a hardware duty cycle operation of the processor based on at least one of a performance requirement and a power requirement.

In an example, the method further comprises: synchronizing a low power state of the plurality of cores; thereafter entering into a package low power state for the processor; and thereafter causing the one or more cores to exit the low power state to continue executing the workload. The method may further comprise communicating the low power state exit request responsive to expiration of a forced idle time duration, in an example.

In another example, an apparatus comprises means for performing the method of any one of the above examples.

In another example, a system has a processor including: a plurality of cores each having one or more hardware threads, where each hardware thread is associated with a forced idle state indicator to indicate whether the hardware thread is enabled to enter into a forced idle state, each of the cores further including a forced idle counter to count cycles in which the core is in the forced idle state; a package forced idle state indicator to indicate whether the processor is enabled to enter into the forced idle state; and a logic to cause at least one of the cores to operate at a higher operating frequency than a requested operating frequency during a duty cycle mode in which at least one of the one or more hardware threads having a workload to perform is to enter into the forced idle state, based on a state of the corresponding forced idle state indicator. The system may further include a dynamic random access memory (DRAM) coupled to the processor.

In an example, a first core of the cores further comprises a handling logic to initiate low power state entry microcode for a first low power state for a first hardware thread of the first core, responsive to a forced idle state request when the forced idle state indicator for the first hardware thread is of an enabled state.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a plurality of cores each to independently execute instructions and including a plurality of logical processors, wherein each logical processor of each of the plurality of cores is to store a hardware indicator to indicate whether the corresponding logical processor is enabled to enter into a forced idle state; and
   a power controller coupled to the plurality of cores and including a hardware duty cycle (HDC) logic to autonomously cause at least one logical processor of one of the plurality of cores to enter into the forced idle state without an operating system request while the at least one logical processor has a workload to execute and to cause the at least one logical processor to exit the forced idle state prior to an end of an idle period if at least one other logical processor of the plurality of cores is prevented from exit from an active state and entry into the forced idle state, based on a state of the hardware indicator of the at least one other logical processor to indicate that the at least one other logical processor is not enabled to enter into the forced idle state.

2. The processor of claim 1, further comprising a configuration register to enable HDC operation of the processor at a package level, wherein the configuration register is controllable by system software.

3. The processor of claim 2, wherein the HDC logic is to set at least one of a maximum active time and a minimum idle time for the HDC operation.

4. The processor of claim 2, wherein the forced idle state is invisible to the system software and corresponds to a low power state of at least a level at which a core clock is disabled.

5. The processor of claim 1, wherein the HDC logic is to cause the at least one logical processor to exit the forced idle state at an expiration of a first timer, if all of the plurality of cores have not entered into the forced idle state.

6. The processor of claim 1, further comprising a first performance counter and a second performance counter, wherein the first performance counter is configured to not count cycles during the forced idle state, and the second performance counter is configured to count cycles during the forced idle state.

7. The processor of claim 1, further comprising:
   a first counter for each of the plurality of cores to count cycles in which at least one logical processor of the core is in the forced idle state; and
   a plurality of low power state counters, each to maintain a count of a number of cycles that the processor is in a corresponding low power state.

8. The processor of claim 1, wherein the HDC logic is to send a forced idle state request to a core if the core is not in at least a first low power state.

9. The processor of claim 8, wherein each of the plurality of cores includes a handling logic to initiate low power state entry microcode for the first low power state, based on the hardware indicator for a first logical processor of the corresponding core being of an enabled state.

10. The processor of claim 1, wherein the power controller includes a low power control logic to select an operating frequency for the processor to be at a reduced operating frequency in a power constrained environment, wherein the reduced operating frequency is less than a maximum efficient frequency, and the HDC logic is to cause the processor to operate at the maximum efficient frequency in the power constrained environment, via the HDC operation.

11. The processor of claim 10, wherein the HDC logic is to cause at least one core to be in the forced idle state while the at least one core has a workload to execute and at least one other core is in a low power state, the power controller to thereafter enable the processor to enter into a package low power state, and after the package low power state, the HDC logic is to cause the at least one core to operate at a higher operating frequency than the reduced operating frequency.

12. The processor of claim 11, wherein the higher operating frequency is transparent to system software.

13. A non-transitory machine-readable medium having stored thereon instructions, which if performed by a machine cause the machine to perform a method comprising:
   autonomously communicating from a power controller a forced idle request to one or more cores of a plurality of cores of a multicore processor when the one or more cores are executing a workload; and
   communicating from the power controller a low power state exit request to the one or more cores in a low power state if a first timer expires prior to the one or more of cores each entering into at least a selected low power state of the forced idle request, the first timer expiration to indicate that at least one of the one or more cores was inhibited from entry into at least the selected low power state based on a forced idle state hardware indicator associated with the at least one core storing a first value to indicate that the at least one core is disabled from entry into the forced idle state.

14. The non-transitory machine-readable medium of claim 13, wherein the method further comprises communicating the forced idle request to any of the plurality of cores that are not presently in at least the selected low power state.

15. The non-transitory machine-readable medium of claim 13, wherein the method further comprises determining at least one of an active time and an idle time for a hardware duty cycle operation of the processor based on at least one of a performance requirement and a power requirement.

16. The non-transitory machine-readable medium of claim 13, wherein the method further comprises:
   synchronizing a low power state of the plurality of cores;
   thereafter entering into a package low power state for the multicore processor; and
   thereafter causing the one or more cores to exit the low power state to continue executing the workload.

17. The non-transitory machine-readable medium of claim 13, wherein the method further comprises communicating the low power state exit request responsive to expiration of a forced idle time duration.

18. A system comprising:
   a processor including:
      a plurality of cores each having one or more hardware threads, wherein each hardware thread is associated with a forced idle state hardware indicator to store an indication of whether the hardware thread is enabled to enter into a forced idle state, each of the plurality of cores further including a forced idle counter to count cycles in which the core is in the forced idle state, wherein when the forced idle state hardware indicator is of a disabled state the hardware thread is to be prevented from entry into the forced idle state;
      a package forced idle state hardware indicator to indicate whether the processor is enabled to enter into the forced idle state; and
      a logic to cause at least one of the plurality of cores to operate at a higher operating frequency than a requested operating frequency during a duty cycle mode in which at least one of the one or more hardware threads having a workload to perform is to enter into the forced idle state, based on a state of the corresponding forced idle state hardware indicator; and
   a dynamic random access memory (DRAM) coupled to the processor.

19. The system of claim 18, wherein a first core of the plurality of cores further comprises a handling logic to initiate low power state entry microcode for a first low power state for a first hardware thread of the first core, responsive to a forced idle state request when the forced idle state hardware indicator for the first hardware thread is of an enabled state.

20. The system of claim 19, wherein the handling logic is to communicate a disable signal to the logic responsive to the forced idle state hardware indicator for the first hardware thread being of a disabled state.

21. The system of claim 20, wherein the logic is to communicate a low power state exit request to at least one core that successfully entered the forced idle state, responsive to receipt of the disable signal.

22. The system of claim 21, wherein the logic is to communicate the low power state exit request prior to a conclusion of an idle period of the duty cycle mode.

* * * * *